United States Patent
Ho et al.

(10) Patent No.: US 9,628,505 B2
(45) Date of Patent: *Apr. 18, 2017

(54) DEPLOYING A SECURITY APPLIANCE SYSTEM IN A HIGH AVAILABILITY ENVIRONMENT WITHOUT EXTRA NETWORK BURDEN

(71) Applicant: International Business Machines Corporation, Armonk, NY (US)

(72) Inventors: Ming Da Ho, Taipei (TW); Ming-Pin Hsueh, Taipei (TW); Ting-Jui Hu, Taipei (TW); Ping-Hung Lee, Taipei (TW); Ming-Hsun Wu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 23 days.

This patent is subject to a terminal disclaimer.

(21) Appl. No.: 14/721,084

(22) Filed: May 26, 2015

(65) Prior Publication Data

US 2016/0269426 A1    Sep. 15, 2016

Related U.S. Application Data

(63) Continuation of application No. 14/641,461, filed on Mar. 9, 2015.

(51) Int. Cl.
*G06F 15/16* (2006.01)
*H04L 29/08* (2006.01)
(Continued)

(52) U.S. Cl.
CPC ...... *H04L 63/1441* (2013.01); *H04L 47/2441* (2013.01); *H04L 47/33* (2013.01); *H04L 63/1416* (2013.01); *H04L 63/1425* (2013.01)

(58) Field of Classification Search
CPC ............... G06F 21/6263; G06F 17/18; G06F 17/30598; G06N 7/005
See application file for complete search history.

(56) References Cited

U.S. PATENT DOCUMENTS 5,706,440 A * 1/1998 Compliment .......... H04L 41/26
370/401
7,734,752 B2    6/2010 Zuk et al.
(Continued)

FOREIGN PATENT DOCUMENTS

CN      103501299 A     1/2014
EP       1648136 B1     3/2014

OTHER PUBLICATIONS

IBM, "List of IBM Patents or Patent Applications Treated as Related (Appendix P)," May 26th, 2015.
(Continued)

*Primary Examiner* — Eleni Shiferaw
*Assistant Examiner* — Mary Li
(74) *Attorney, Agent, or Firm* — Michael O'Keefe

(57) ABSTRACT

A security appliance system routing strings of data packets in a high availability environment. The security appliance system contains a plurality of intrusion prevention systems connected to a load balancer and a computing device. Each intrusion prevention system contains stored session state information in a local session state data store, the load balancer contains a shared hash algorithm, and the computing device contains a connection state manager containing a network session state data store. The computing device includes a topology manager recording connectivity changes of the intrusion prevention systems and accordingly adjusting the shared hash algorithm for the recorded connectivity changes. Using the shared hash algorithm and routing information, a hash value is assigned to received strings. Strings are forwarded an intrusion prevention system based on
(Continued)

assigned hash value and processed using stored session state information within the local session state data store and the network session state data store.

6 Claims, 12 Drawing Sheets

(51) Int. Cl.
*G06F 21/62* (2013.01)
*H04L 29/06* (2006.01)
*H04L 12/851* (2013.01)
*H04L 12/801* (2013.01)

(56) References Cited

U.S. PATENT DOCUMENTS

| | | | |
|---|---|---|---|
| 7,836,360 B2 | 11/2010 | Zufelt | |
| 7,941,837 B1 | 5/2011 | Jiang et al. | |
| 8,291,258 B2 | 10/2012 | Narayanaswamy et al. | |
| 8,776,207 B2 | 7/2014 | Mihelich et al. | |
| 2003/0076822 A1* | 4/2003 | Shalom | H04L 49/90 370/378 |
| 2005/0184163 A1* | 8/2005 | de Jong | G06Q 20/341 235/492 |
| 2006/0005231 A1* | 1/2006 | Zuk | H04L 29/06 726/3 |
| 2009/0025010 A1* | 1/2009 | Foottit | H04L 63/08 719/313 |
| 2012/0210416 A1* | 8/2012 | Mihelich | H04L 63/0218 726/11 |
| 2014/0122743 A1* | 5/2014 | Di Benedetto | H04L 69/22 709/250 |
| 2014/0143854 A1 | 5/2014 | Lopez et al. | |
| 2014/0337417 A1* | 11/2014 | Park | H04L 67/1027 709/203 |
| 2015/0195122 A1* | 7/2015 | Dahlberg | H04L 49/00 709/223 |

OTHER PUBLICATIONS

Ho et al., "Deploying a Security Appliance System in a High Availability Environment Without Extra Network Burden," Filed on Mar. 9, 2015, p. 1-53, U.S. Appl. No. 14/641,461.

He et al., "Mazu: Taming Latency in Software Defined Networks," University of Wisconsin—Madison, MINDS@UW, http://digital.library.wisc.edu/1793/68830, Apr. 30, 2014, pp. 1-15.

Kim, "Formal Modeling and Verification of High-Availability Protocol for Network Security Appliances," ATVA '07 Proceedings of the 5th International Conference on Automated technology for verification and analysis, 2007, LNCS 4762, pp. 489-500.

Mell et al., "The NIST Definition of Cloud Computing," National Institute of Standards and Technology, Information Technology Laboratory, Version 15, Oct. 7, 2009.

Sonicwall L.L.C., "The SRA Platform, SRA Load Balancing and High Availability," http://www.sonicwall.com/us/en/products/326.html, Accessed on Jan. 12, 2015.

* cited by examiner

DEPLOYING A SECURITY APPLIANCE SYSTEM IN A HIGH AVAILABILITY ENVIRONMENT WITHOUT EXTRA NETWORK BURDEN

FIELD OF INVENTION

The present invention relates generally to the field of computing, and more particularly to deploying security appliances in a high availability environment.

BACKGROUND

An intrustion prevention system (IPS) is a network security appliance designed to analyze the flow of network traffic in order to detect and prevent exploitation of system vulnerabilities, such as malicious attacks on a network. Many network appliances, including an IPS, may be required to operate in a high-availability model. The high-availability model refers to a system that is required to be operational for a long period of time. For example, industry standards may require a component to be operational 99.999% of the time for the component to be considered high-availability.

SUMMARY

Embodiments of the present invention disclose a method and system for operating a security appliance system in a high availability environment. The security appliance system contains a plurality of intrusion prevention systems connected to a load balancer and a client computing device containing a connection state manager and a topology manager. Each intrusion prevention system contains stored session state information in a local session state data store, the load balancer contains a shared hash algorithm, and the connection state manager contains a network session state data store. The topology manager records connectivity changes of the intrusion prevention systems and adjusts the shared hash algorithm to accommodate the recorded connectivity changes. A string of data packets are received in the load balancer, each data packet includes session state information and routing information and the string includes all data packets sent from an identified source to an identified destination. A hash value is generated by the load balancer for the string using the shared hash algorithm and the routing information. One of the plurality of intrusion prevention systems is selected by the load balancer based on the generated hash value. The string is forwarded from the load balancer to the selected intrusion prevention system. When the selected intrusion prevention system determines that the forwarded string has stored session state information within the local session state data store and the network session state data store using the generated hash value, the selected intrusion prevention system processes the forwarded string using the stored session state information. The selected intrusion prevention system updates the stored session state information in the local session state data store and the network session state data store using the processed string therefore allowing the forwarded string to be processed by another intrusion prevention system within the plurality of intrusion prevention systems when the selected intrusion prevention system fails.

DETAILED DESCRIPTION

Figure 1:
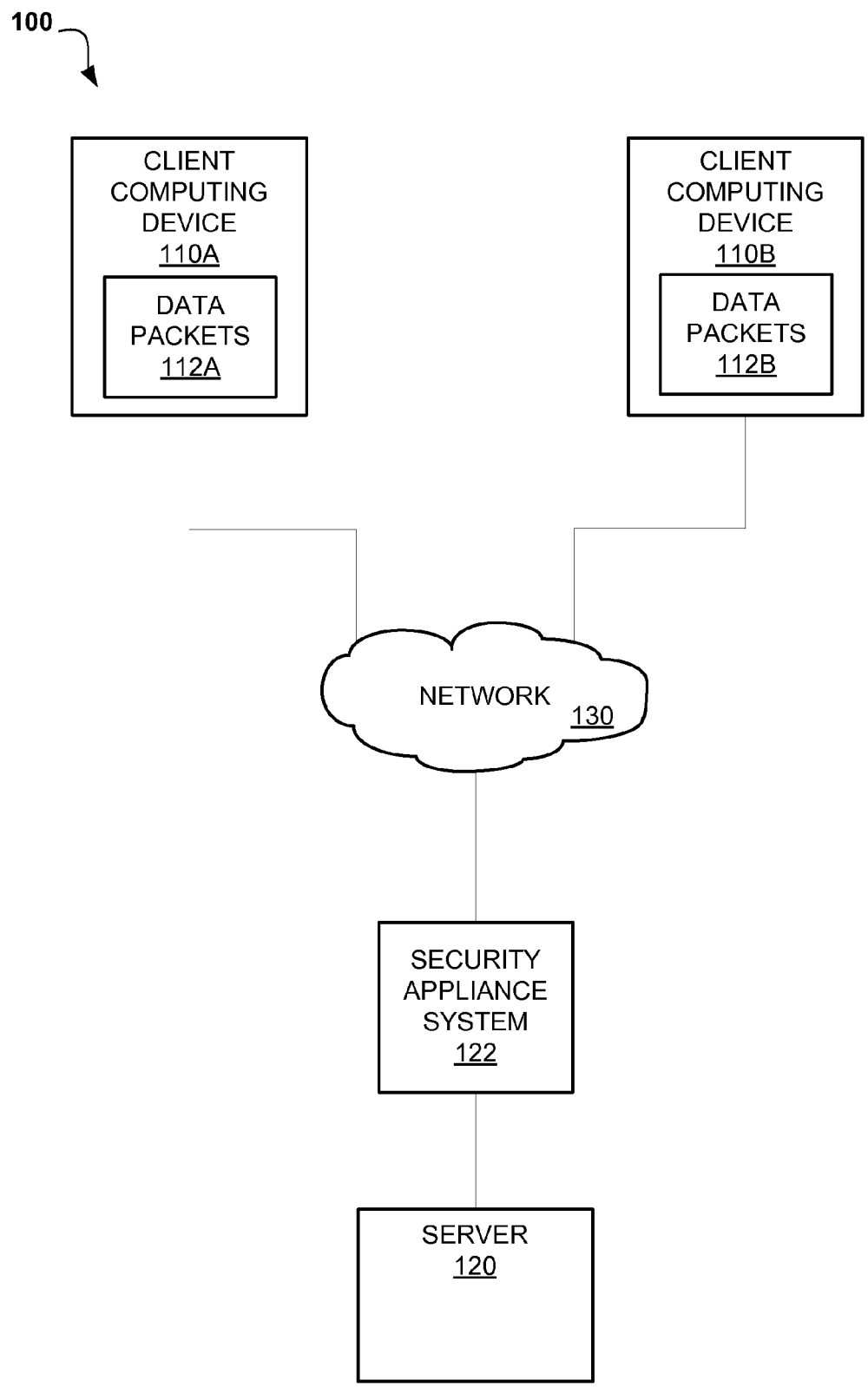
FIG. 1 is an illustration of an exemplary architecture for a security appliance system that is suited for deployment of security appliances in a high availability environment, in accordance with one embodiment of the present invention.

Embodiments of the present invention are directed to deploying a security appliance system in a high availability environment without extra burden applied on the network. Security appliances that may be deployed within a network may include intrusion prevention systems. Intrusion prevention systems may be network devices, which may be hardware, firmware, software, or a combination of these, that filter network connections in order to detect possible malware within packets of data transmitted over the connection. If an intrusion prevention system detects the presence of malware on a network connection, the intrusion prevention system may alert an information technology manager or block the connection to prevent the malware from entering the network.

When deploying security appliances in high-availability environments, a network redundancy model may be implemented. Network redundancy describes a method for providing a backup device or component for a system in the event of a disruption to the primary data path. For example, a network may implement Device A in the primary data path and Device B, which is identical to Device A, in a secondary data path. If Device A fails, the network redundancy model dictates that the string of data packets that constitutes the network connection be rerouted to Device B in the secondary data path.

Deployment of intrusion prevention systems using network redundancy may encounter difficulties, such as inefficiency and failure to fully utilize the total capacity of the system. Additionally, an intrusion prevention system may not be suited for a typical network redundancy arrangement because intrusion prevention systems may require historic connection states to determine whether a connection should be permitted. Furthermore, adopting a high-availability network redundancy model in large scale deployments may also be very costly. For example, in a system that requires the deployment of 100 intrusion prevention systems to protect a network, the deployment of 200 intrusion prevention systems would be needed in order to satisfy the requirements of the network redundancy model. This arrangement illustrates that 100 purchased intrusion prevention systems may not be actively used and the network is not operating at its full capacity. As such, it may be advantageous, among other things, to implement an alternative system to the network redundancy model that increases network efficiency and capacity, such as using stored connection data in a central management storage system to recover the session state from an alternate intrusion prevention system rather than an unused backup device.

According to one embodiment, strings of data packets, such as packets containing network connection state information, session state information, or flow state information, may be received in a load balancer. A load balancer is a network device that distributes network traffic across a number of network components. By distributing traffic across a network, load balancers may increase overall network capacity and reliability. The load balancer may distribute the received strings of data packets to different devices within the network based on a hash value or a digest value that the load balancer may generate and assign to each string of data packets based on a shared hash algorithm. A shared hash algorithm may be a means of using information contained in a string of data packets to generate a hash value. A hash value may be a distinct value used to direct a string of data packets to a particular device within the network, such as a primary security device and a backup security device.

For example, using the hash value, an intrusion prevention system may be able to determine whether the received string of data packets belongs the intrusion prevention system itself or a different intrusion prevention system within the network. If an intrusion prevention system fails, the load balancer may forward the string of data packets to an alternate active intrusion prevention system within the network to act as a backup for the failed intrusion prevention system. When an alternate intrusion prevention system receives a string of data packets with a hash value designating a different primary intrusion prevention system, the alternate intrusion prevention system may retrieve session state information for the string of data packets from a connection state manager. The connection state manager is a central management system that stores the packet and session state data based on the information within the hash value. Once the alternate intrusion prevention system retrieves the stored session state from the connection state manager, the alternate intrusion prevention system may proceed processing the string of data packets received.

Additionally, many networks may frequently encounter new security appliances deployed to the network and other appliances permanently removed from the network. The mapping of these components within the network may be handled by a topology manager. A topology manager is a device that records a change in the network topology and dynamically adjusts the shared hash algorithm to accommodate the change in the network topology.

The present embodiment may utilize a single node of connection state management to achieve high availability for an intrusion prevention system without the need to implement a pair network redundancy model, which may be costly due to low utilization in large scale deployments. Additionally, the present embodiment may adopt a shared unified hash algorithm to minimize network data exchanged to achieve increased efficiency in a large and complex network environment. Therefore, the embodiments of the present invention may have the capacity to improve the technical field of deploying security appliances in high availability environments by providing a greater capacity for utilization, a better ratio of utilized intrusion prevention systems to deployed intrusion prevention systems than the pair network redundancy model, reduced costs for deploying intrusion prevention systems in a large scale cloud environment, and a higher fault tolerance for the network.

FIG. 1 is an illustration of an exemplary architecture for a security appliance system 100 that is suited for deployment of intrusion prevention systems in a high availability environment, in accordance with one embodiment of the present invention. The security appliance environment 100 may include client computing devices 110 that may further include data packets 112, a server 120, a security appliance system 122, and a communication network 130 interconnecting client computing devices 110, server 120, and security appliance system 122. Generally, the security appliance environment 100 may include a plurality of client computing devices 110 and servers 120 interconnected over a suitable network 130, in accordance with one or more embodiments of the invention.

The communication network 130 may include various types of communication networks, such as a wide area network (WAN), local area network (LAN), a telecommunication network, a wireless network, a public switched network and/or a satellite network, and may include connections, such as wire, wireless communication links, or fiber optic cables. In general, communication network 130 can be any combination of connections and protocols that will support communications between client computing devices 110, server 120, and security appliance system 122, in accordance with embodiments of the invention.

Client computing devices 110 may be, for example, mobile devices, telephones, personal digital assistants, netbooks, laptop computers, tablet computers, desktop computers, or any type of computing devices sending and receiving stings of data packets 122. Client computing devices 110 may transmit and receive strings of data packets 112.

Data packets 122 may be retained in client computing device 110. These data packets may be linked together in strings or represented as connection states or session states between client computing device 110 and server 120 and filtered through security appliance system 122. The data packets 112 may be sent from client computing device 110A and received by client computing device 110B through security appliance system 122 and server 120. While being transmitted to server 120, the data packets 122 may be processed by security appliance system 122.

Server 120 represents the computing environment that receives the filtered data packets 112 from security appliance system 122. Server 120 may operate in a cloud computing service model, such as Software as a Service (SaaS), Platform as a Service (PaaS), or Infrastructure as a Service (IaaS). Server 120 may also be located in a cloud computing deployment model, such as a private cloud, community cloud, public cloud, or hybrid cloud.

Figure 2:
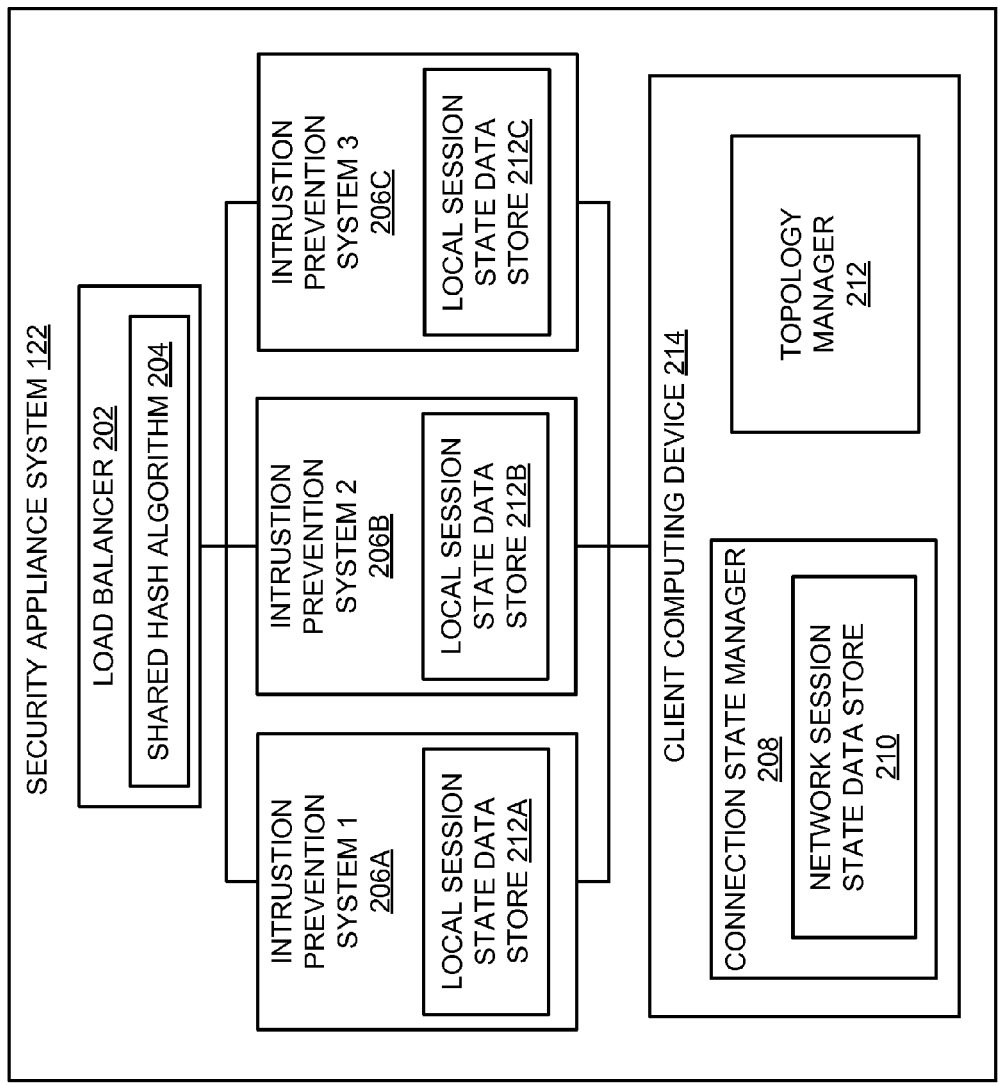
FIG. 2 is an illustration of a functional block diagram of a security appliance system, in accordance with one embodiment of the present invention.

FIG. 2 is an illustration of a functional block diagram of a security appliance system 122 that resides within the security appliance system 100, in accordance with one embodiment of the present invention. Security appliance system 122 may include a load balancer module 202, intrusion prevention systems 206, and a client computing device 214 that further contains a topology manager 212 and a connection state manager 208.

Security appliance system 122 may operate generally by receiving a string of data packets 112 from client computing device 110 transmitted over network 130 to server 120. Upon arrival at the security appliance system 122, the string of data packets 112 may be received by load balancer module 202. Load balancer module 202 represents a module, which may be hardware, firmware, software, or a combination of these, that may distribute network traffic among the intrusion prevention systems 206A-206C based on an assigned hash value generated by a shared hash algorithm 204 contained within the load balancer module 202. The shared hash algorithm 204 may represent an algorithm that generates a hash value for each string of data packets 112. The hash value assigned to a string of data packets 112 may direct the string of data packets 112 to a particular intrusion prevention system 206A-206C within the security appliance system 122. As previously described, intrusion prevention systems 206A-206C may be network devices, which may be hardware, firmware, software, or a combination of these, that filter through network connections, including strings of data packets 112, in order to detect possible malware within packets of data contained in the connection. Each intrusion prevention system 206 may include a local session state data store 212 used to locally retain a session state information for strings of data packets 112. Upon processing strings of data packets, the intrusion prevention systems 206A-206C may update the session state information contained in the local session state data store 212 as well as update the session state information stored in the connection state manager 208 on client computing device 214.

Client computing devices 214 may be, for example, mobile devices, telephones, personal digital assistants, netbooks, laptop computers, tablet computers, desktop computers, or any type of computing devices capable of hosting the connection state manager 214 and the topology manager 212.

Connection state manager 208 may include a network, or centralized, session state data store 210, which may store session state and packet information for strings of data packets 112. The session state data store 210 may be a cumulative session state data store that may include the same session state information that is locally stored in each local session state data store 212. As described in more detail below with relation to FIG. 3, the centralized session state data store 210 may act a backup data store for session state information in the event an intrusion prevention system 206 in the network fails and an alternate intrusion prevention system 206 must process strings of data packets 112 that are not locally stored.

Topology manager 212 may represent a network device that may monitor connectivity status and connectivity changes of intrusion prevention systems 206A-206C. Topology manager 212 may assign each intrusion prevention system 206A-206C with a unique value associated with the hash value assigned to strings of data packets 112 by shared hash algorithm 204 when each intrusion prevention system 206 is connected to the security appliance system 122. As described in more detail below in relation to FIG. 6, topology manager 212 may also reassign values to intrusion prevention systems 206A-206C when an intrusion prevention system 206 within the security appliance system 122 is taken offline.

Figure 3:
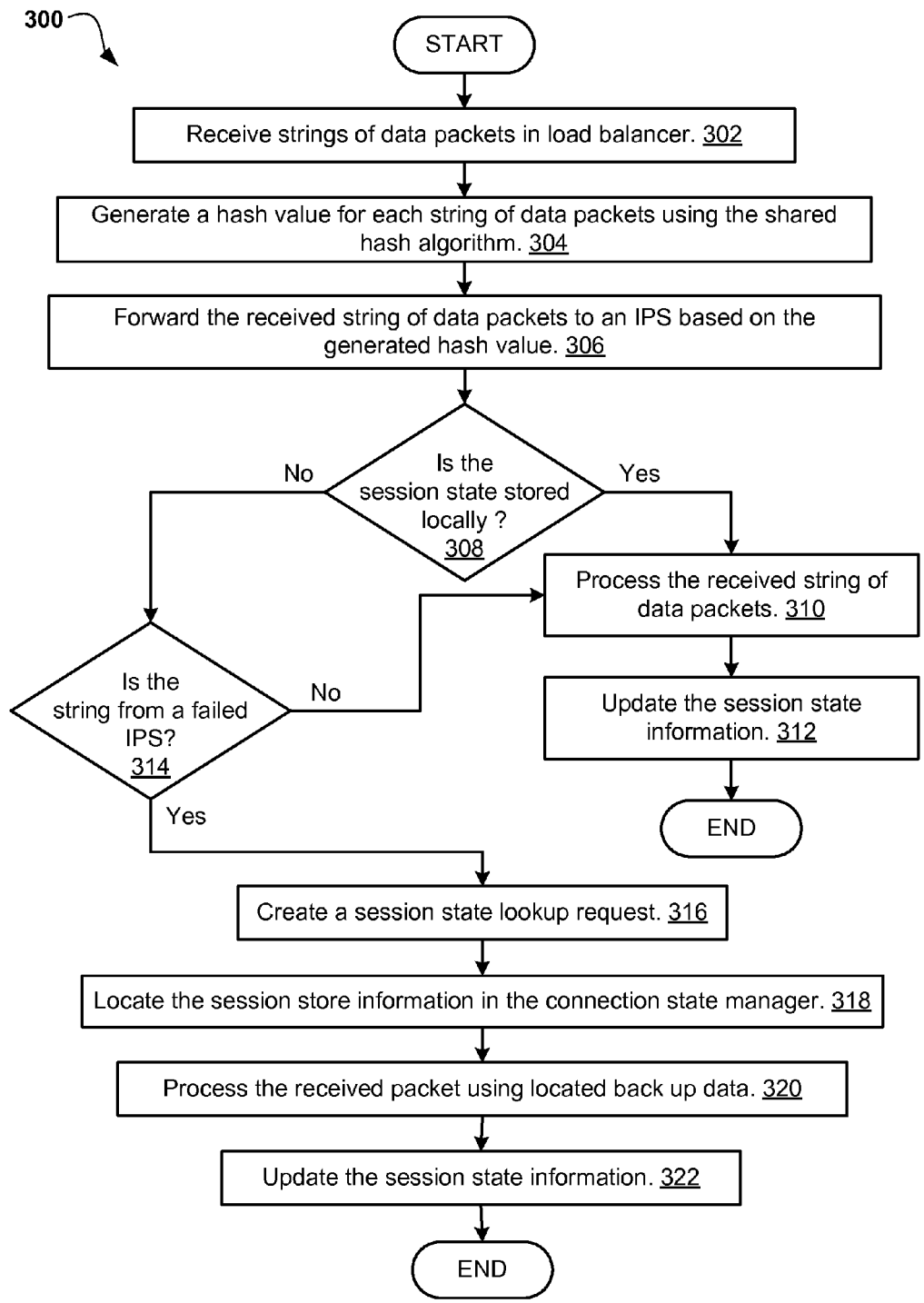
FIG. 3 is an operational flowchart illustrating the steps carried out by the security appliance system of FIG. 1, in accordance with an embodiment of the present invention.

FIG. 3 is an operational flowchart 300 illustrating the steps of the security appliance system 122 of FIG. 1, in accordance with an embodiment of the present invention. The security appliance system 122 may receive strings of data packets 112 in load balancer module 202 (step 302). The strings of data packets 112 may represent an established connection between client computing device 110 and server 120 via security appliance system 122 or a new connection attempting to be established between client computing device 110 and server 120.

The load balancer module 202 may generate a hash value for each string of data packets 112 using the shared hash algorithm 204 based on routing information contained within each received string of data packets 112 (step 304). In an exemplary embodiment, the routing information includes five tuples of routing information that may be an ordered set of values used to pass a string of information from one program to another program. The five tuples of routing information that may be used by load balancer module 202 to generate the hash value may be source internet protocol (IP) address, destination IP address, protocol, source port, and destination port. For example, the last hexadecimal value in the hash value may represent the destination port for a string of data packets 112. Therefore the load balancer module 202 may direct a string of data packets 112 to an intrusion prevention system 206 based on the last hexadecimal value in the hash value.

The load balancer module 202 may then forward the received string of data packets 112 to an intrusion prevention system 206 based on the generated hash value for the received string of data packets 112 (step 306). Since the load balancer module 202 distributes network traffic, such as strings of data packets 112, within a network of intrusion prevention systems 206A-206C, the load balancer module 202 may use the hash value to forward the string of data packets 112 to an intrusion prevention system 206. For example, if a network of intrusion prevention systems includes three intrusion preventions systems 206A-206C and the hash value for a string of data packets 112 is #0x3741, then that particular string of data packets 112 made forwarded to the first intrusion prevention system 206A in the network since the last hexadecimal value in the hash value is "1." Similarly, a string of data packets 112 assigned a hash value of #08362 may be forwarded to a different intrusion prevention system 206B since the last hexadecimal value in the hash value is "2."

The intrusion prevention system 206 receiving the string of data packets 112 may then determine whether the session state information for the received string of data packets 112 is stored locally within the intrusion prevention system 206 (step 308).

If the session state information is stored locally (decision step 308, "Yes" branch), then, the intrusion prevention system 206 may process the string of data packets 112 using the locally stored session state information to determine if malware is present within the string of data packets 112 (step 310).

Once the intrusion prevention system has completed processing the received string of data packets 112, the locally stored session state may be updated so that later strings of data packets 112 may be processed (step 312). Furthermore, the intrusion prevention system 206 may send session state information to the connection state manager 208 to update the session state information for the processed string of data packets 112 contained in the session state data store 210 in the event an intrusion prevention system 206A fails and an alternate intrusion prevention system 206B or 206C may be required to serve as a backup for processing received strings of data packets 112. For example, if a primary intrusion prevention system 206A for a received string of data packets 112 fails and the received string of data packets 112 is sent to an alternate intrusion prevention system 206B for processing, then the alternate intrusion prevention system 206B or 206C may be able to recover the currently inaccessible session state information stored in the primary intrusion prevention system 206A from the session state data store 210 located in the connection state manager 208. Additionally, whenever an intrusion prevention system 206 processes a string of data packets 112 that represent a new connection to the network, updating the session state information may include creating a new entry of session state information in the local data store for the new session state information and saving the session state information in the newly created entry.

If the session state information is not stored locally (decision step 308, "No" branch), then, at 314, the intrusion prevention system 206 may determine whether the string of data packets 112 is from a failed intrusion prevention system 206 within the network. An intrusion prevention system may fail if it is no longer connected to the network or no longer able to receive strings of data packets 112.

If the hash value assigned to the string of data packets 112 is not from a failed intrusion prevention system (decision step 314, "No" branch), then the intrusion prevention system 206 may process the received string of data packets 112 (step 310). If the intrusion prevention system 206 is unable to locate locally stored session state information for the string of data packets 112 and the session state is not from a failed intrusion prevention system 206 within the network, the string of data packets 112 may be a new connection to the network that must be established and, therefore, the intrusion prevention system 206 may process the string of data packets 112 itself as a new connection. For example, if an intrusion prevention system 206A receives a new string of data packets 112 from the load balancer module 202 that is assigned a hash value of #0x5381, the intrusion prevention system 206A may not find locally stored session state information for the received string of data packets. If the hash value assigned to the new string of data packets 112 indicates that the intrusion prevention system 206A is the proper destination port for the string of data packets 112, the string of data packets may not be from an alternate intrusion prevention system 206B or 206C within the network. Since the session state information is not locally stored and the received string of data packets is not from a failed intrusion prevention system, the received string of data packets 112 may be a new connection and intrusion prevention system 206A may process the string of data packets 112 itself.

If the string of data packets 112 is from a failed intrusion prevention system 206 within the network (decision step 314, "Yes" branch), then the intrusion prevention system 206 that received the string of data packets 112 may create a session state lookup request (step 316). The session state lookup request may be a query sent to a connection state manager 208 on client computing device 214 used to locate the session state information for a failed intrusion prevention system 206. The session state lookup request may be created by encapsulating the hash value containing the five tuples of routing information. The connection state manager 208 may be a device that keeps session state information for each intrusion prevention system 206 in the network.

The connection state manager 208 may then locate the session state information corresponding to the session state lookup request (step 318). The connection state manager 208 retains session state information in a session state data store 210. When performing a session state lookup request, the connection state manager 208 may perform a table lookup to locate session state information within the session state data store 210 corresponding to the session state lookup request.

The intrusion prevention system 206 may process the received string of data packets 112 using the session state information located by the connection state manager 208 in step 318 (step 320).

The connection state manager 208 may update the session state information in the centralized session state data store 210 (step 322). Once the connection state manager 208 has completed processing the received string of data packets 112, the session state may be updated so that later strings of data packets 112 may be processed.

Figure 4A:
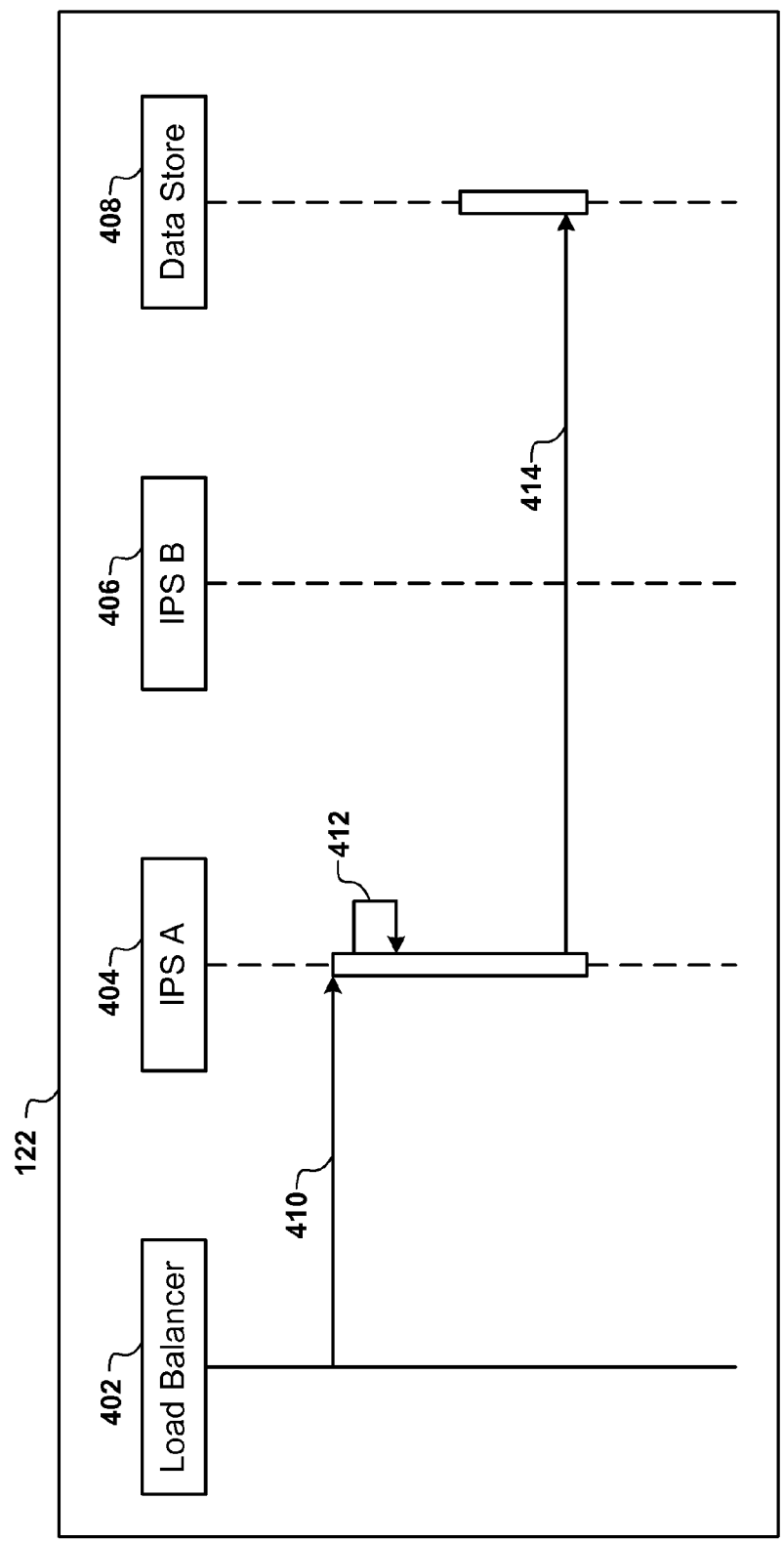
FIGS. 4A and 4B are message flow diagrams that illustrate a security appliance system engaging in the processing of strings of data packets, in accordance with one embodiment of the present invention.
Figure 4B:
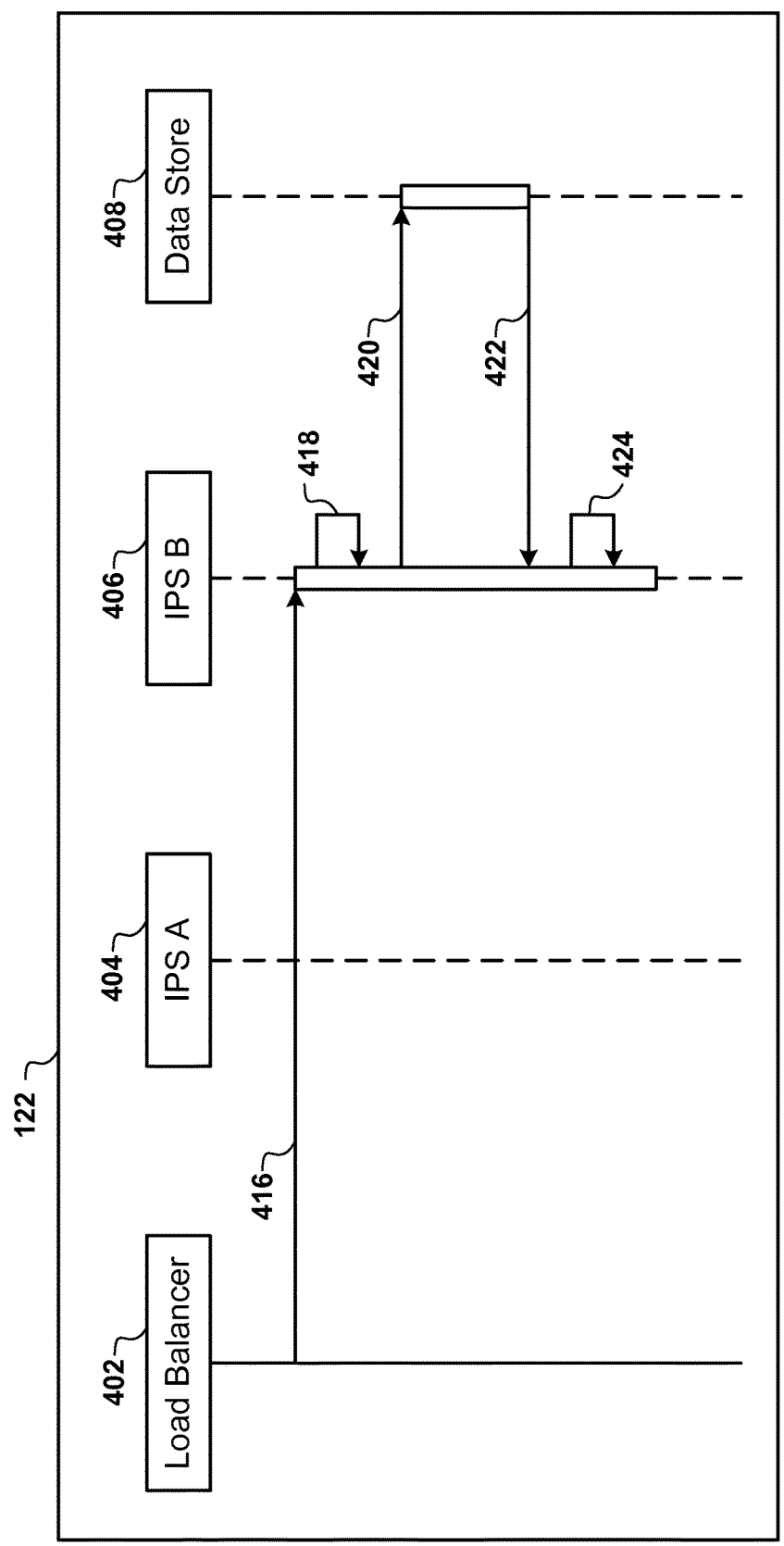

FIGS. 4A and 4B illustrate a security appliance system 122 engaging in the processing of strings of data packets 112, in accordance with one embodiment of the present invention. The security appliance system 122 may be operating under normal operating conditions when all of the intrusion prevention systems 206A-206C registered with the topology manager 212 are operational and processing strings of data packets 112. Conversely, the security appliance system 122 may be operating under abnormal operating conditions when less than all of the intrusion prevention systems 206A-206C registered with the topology manager 212 are operational and processing strings of data packets 112.

FIG. 4A depicts a message flow diagram of a security appliance system 122 operating under normal operating conditions, in accordance with one embodiment of the present invention. As mentioned above, the load balancer 402 may assign a hash value to the string of data packets 112 using the shared hash algorithm 204. Once the load balancer 402 assigns a hash value to the string of data packets 112, the load balancer may send the string of data packets 112 to the primary intrusion prevention system (IPS A) 404 (arrow 410). Upon receiving the string of data packets 112, IPS A 404 may process the string of data packets 112 (arrow 412). Once processing of the string of data packets 112 is completed, IPS A 404 may update the session state in the local session state data store and send the updated session state information for storage in the centralized session state data store 408 in the connection state manager 208 (arrow 414).

FIG. 4B depicts a security appliance system 122 operating under abnormal operating conditions, in accordance with one embodiment of the present invention. For example, an abnormal operating condition may occur when an intrusion prevention system 404 within the network fails. If IPS A 404 fails when the load balancer 402 is prepared to send the string of data packets 112 to IPS A 404, then the load balancer 402 may send the string of data packets 112 to an alternate intrusion prevention system (IPS B) 406 within the network for processing (arrow 416). IPS B 406 may be another intrusion prevention system 206 within the network actively receiving strings of data packets 112 from the load balancer 402 based on the hash value assigned to the string of data packets 112. When IPS B 406 receives a string of data packets 112 assigned a hash value that indicate IPS A 404 is the primary intrusion prevention system to handle that string of data packets 112, then IPS B 406 may process the string of data packets 112 (arrow 418). However, since IPS B 406 may not possess a local store of the session state information for the received string of data packets 112, IPS B 406 may send a session state lookup request to the connection state manager 208 to search the centralized session state data store 408 for the session state information relating to the received string of data packets 112 belonging to IPS A 404 (arrow 420). Once the session state information is located during the session state lookup, the information is sent from the centralized session state data store 408 to IPS B 406 (arrow 422) and IPS B 406 may continue processing the string of data packets 112 (arrow 424).

Figure 5:
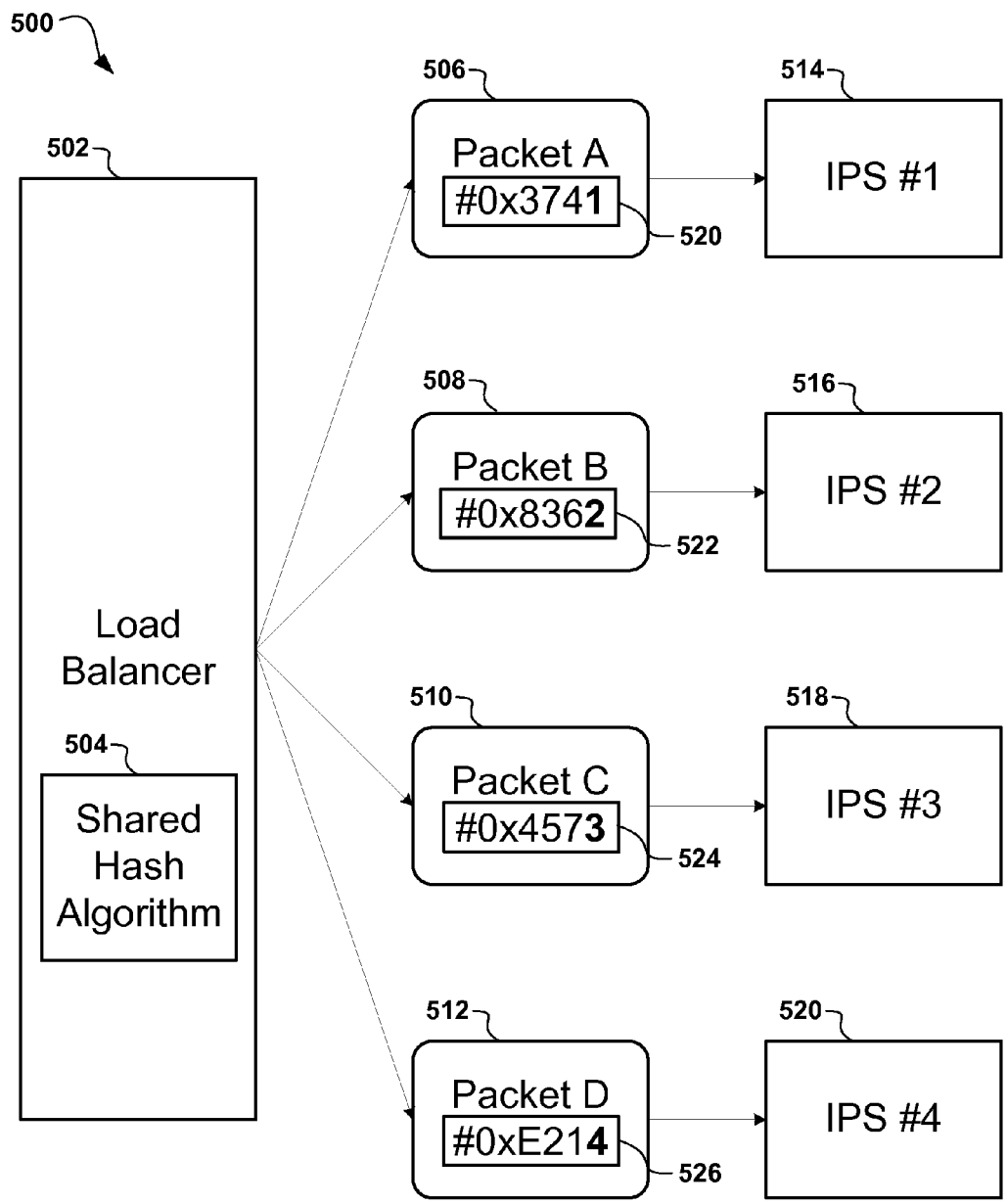
FIG. 5 illustrates a load balancer distributing packets to intrusion prevention systems during normal operating conditions, in accordance with one embodiment of the presenting invention.

FIG. 5 illustrates a load balancer 502 distributing strings of data packets 112 to intrusion prevention systems 514-520 within a network under normal operating conditions 500, in accordance with one embodiment of the present invention. As previously described, the security appliance system 122 may be operating under normal operating conditions when all of the intrusion prevention systems 514-520 registered with the topology manager 212 are operational and processing strings of data packets 112. When the strings of data packets 112 are being processed in the load balancer 502, the shared hash algorithm 504 may generate a hash value 520-526 for each string of data packets 112 based on the five tuples of routing information, such as source internet protocol (IP) address, destination IP address, protocol, source port, and destination port. For example, the hash value 520 for Packet A 506 may be #0x3741 based on the five tuples of routing information associated with Packet A 506. The last hexadecimal value within the generated hash value 520-526 may represent the destination port for the string of packets. Since the particular intrusion prevention system 514-520 storing the session state information for a particular string of data packets 112 may be the destination port for the string of data packets 112, the load balancer 502 may use the last hexadecimal value within the hash value 520-526 to forward the string of data packets 112 to the intrusion prevention system 514-520 storing the session state information for the string of data packets 112. For example, Packet B 508 may have a hash value 522 of #0x8362. Since the last hexadecimal value in the hash value 522 for Packet B 508 is the integer "2," then the load balancer 502 may forward Packet B 508 to IPS #2 516. Similarly, if the hash value 524 for Packet C 510 is #0x4573, the load balancer 502 may forward Packet C 510 to IPS #3 518, since the last hexadecimal value in the hash value 510 is the integer "3."

Figure 6:
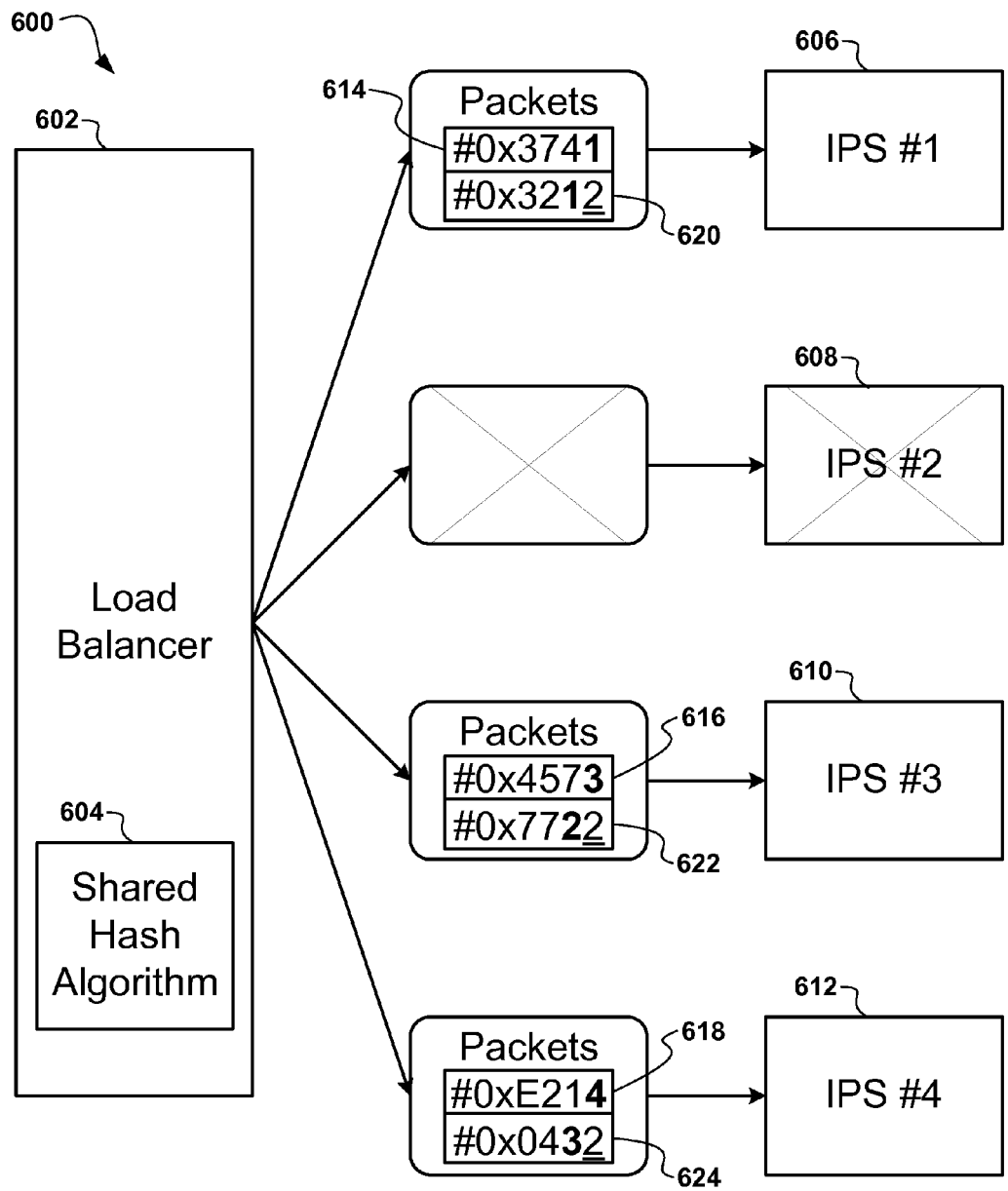
FIG. 6 illustrates a load balancer distributing packets to intrusion prevention systems during abnormal operating conditions, in accordance with one embodiment of the presenting invention.

FIG. 6 illustrates a load balancer 602 distributing strings of data packets 614-624 to intrusion prevention systems 606-612 within a network under abnormal operating conditions 600, in accordance with one embodiment of the present invention. As previously described, abnormal operating conditions may relate to less than all of the intrusion prevention systems 606-612 registered with the topology manager 212 being operational and processing strings of data packets 614-624. In an illustration of abnormal operating conditions 600, an intrusion prevention system (IPS #2) 608 within a network of intrusion prevention systems 606-612 may fail. Therefore, the strings of data packets 620-624 originally associated to IPS #2 608 may be distributed by the load balancer 602 implementing shared hash algorithm 604 to the remaining operational intrusion prevention systems (IPS #1) 606, (IPS #3) 610, and (IPS #4) 612 for processing.

The alternate intrusion prevention system 606, 610, or 612 for a string of data packets 620-624 may be identified by observing the penultimate hexadecimal value in the hash value assigned to the string of data packets 620-624. For example, if the hash value associated with string of data packets 620 is #0x3212 and the primary intrusion prevention system 608 associated with string of data packets 620 fails, then load balancer 602 may forward string of data packets 620 to IPS #1 606, since the penultimate hexadecimal value is the integer "1."

When an intrusion prevention system 608 fails, the topology manager 212 may reclassify the remaining intrusion prevention systems 606, 610, and 612 on the network. For example, if IPS #2 608 fails, only three intrusion prevention systems 606, 610, and 612 remain operational within the network. Since IPS #3 610 may be considered the second intrusion prevention system in the network while IPS #2 608 is offline, a string of data packets 622 with a penultimate hexadecimal value of "2" in the hash value may be forwarded to IPS #3 for processing during the period IPS #2 is offline. Similarly, IPS #4 618 may be considered the third intrusion prevention system in the network when IPS #2 608 is offline. Therefore, IPS #4 612 may be forwarded a string of data packets 624 with "3" as the penultimate hexadecimal value in the hash value.

Figure 7:
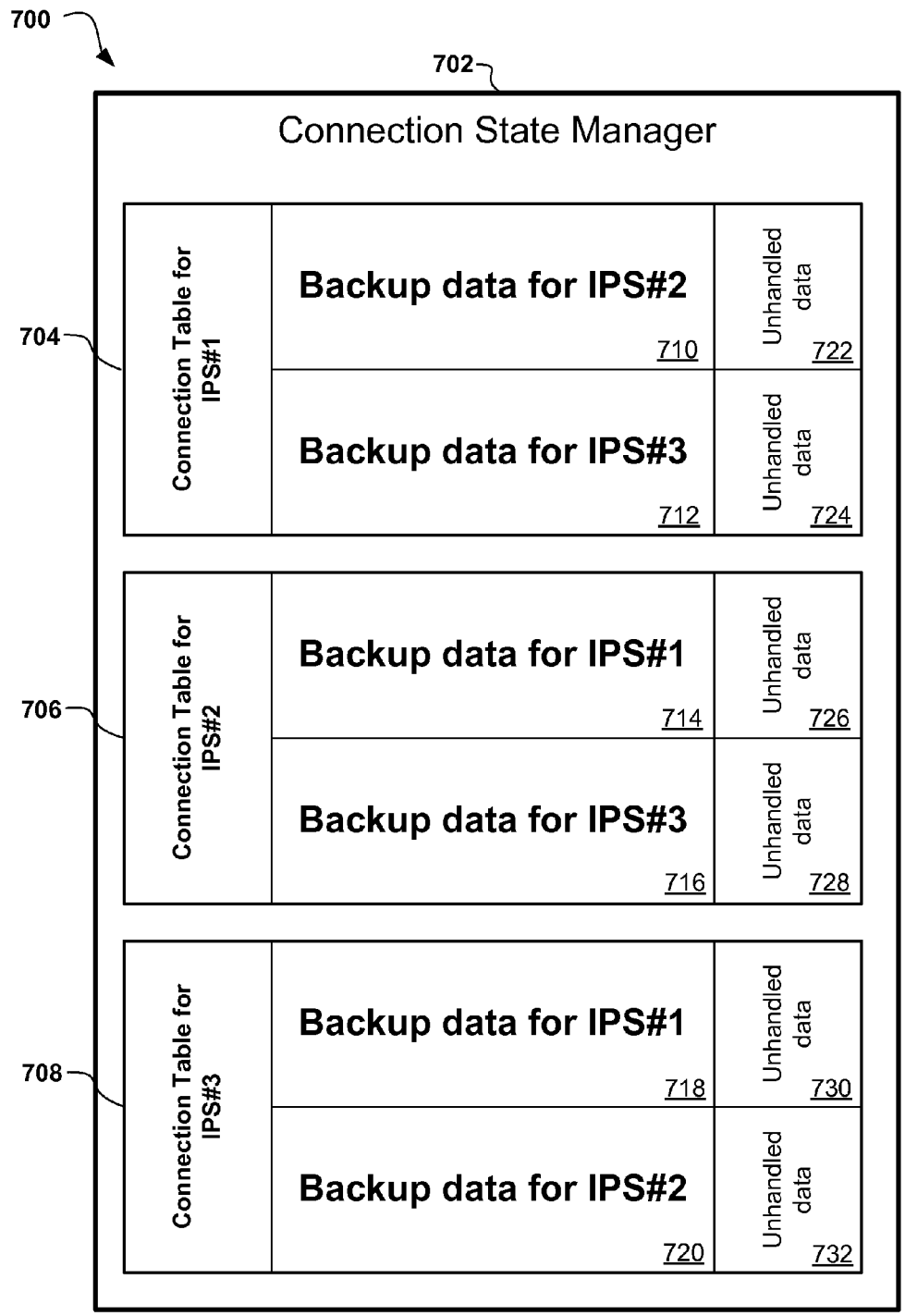
FIG. 7 is an illustration of a connection state manager for storing session states, in accordance with one embodiment of the presenting invention.

FIG. 7 is an illustration of a connection state manager system 700 used for storing session state information, in accordance with one embodiment of the present invention. As previously described, the connection state manager 702 may be a central management system that stores the packet and session state data based on the information within the hash value. The connection state manager 702 may provide a means for an intrusion prevention system 206 to recover session state information for a string of data packets 112 when the session state information is not locally stored in the intrusion prevention system 206. The session state information within the connection state manager 702 may be organized into a series of tables for each intrusion prevention system 206 within the network. For example, if a network includes three intrusion prevention systems 206 labeled IPS #1, IPS #2, and IPS #3, the connection state manager 702 may partition the session state data store into a connection table 704-708 for each intrusion prevention system 206A-206C within the network.

In order to quickly recover backup session state information, the connection state manager 702 may partition each connection table 704-708 into backup data tables 710-720 according to the particular backup data stored within each connection table 704-708. For example, in the connection table for the IPS #1 704, backup session state data for IPS #2 710 and backup session state data for IPS #3 712 may be stored. Therefore, if an intrusion prevention system 206 receives a session state lookup request for a string of data packets 112 with a different intrusion prevention system 206 as the primary intrusion prevention system 206 for processing that string of data packets 112, the receiving intrusion prevention system may locate the session state information in the backup data store 710-720 corresponding to the failed intrusion prevention system 206. For example, if IPS #2 206B in a three intrusion prevention system network fails and IPS #1 206A receives a string of data packets 112 designating IPS #2 206B as the primary device, IPS #1 206A may retrieve the session state information from the IPS #2 backup data store 710 in the IPS #1 connection table 704 of the connection state manager 702. This partitioning may allow the connection state manager to perform multiple lookup requests simultaneously and ease potential reader-writer issues the system may experience.

Since the intrusion prevention systems 206A-206C must process strings of data packets 112 very quickly, the intrusion prevention systems 206A-206C may not organize the session state information before sending the session state information to the connection state manager 702 for storage. Therefore, the connection state manager 702 may include tables of unhandled data 722-732 within each connection table 704-708. Unhandled data 722-732 may represent unsorted data that each intrusion prevention system 206 within the network has sent to the connection state manager 702 for storage. The connection state manager 702 may organize the unhandled data in a logical manner, such as by date, name, source port, or hash value, in order for the session state information to be located in the event an intrusion prevention system 206 fails and the connection state manager 702 must locate the session state information.

When a session state lookup request is received by the connection state manager 702, the connection state manager 702 may be able to locate the corresponding connection table 704-708 according to the hash value of the string of data packets 112. The connection state manager 702 may begin locating the session state information by examining the unhandled data 722-732 awaiting to be organized by the session state manager 702 then searching the backup data tables 710-720.

Figure 8:
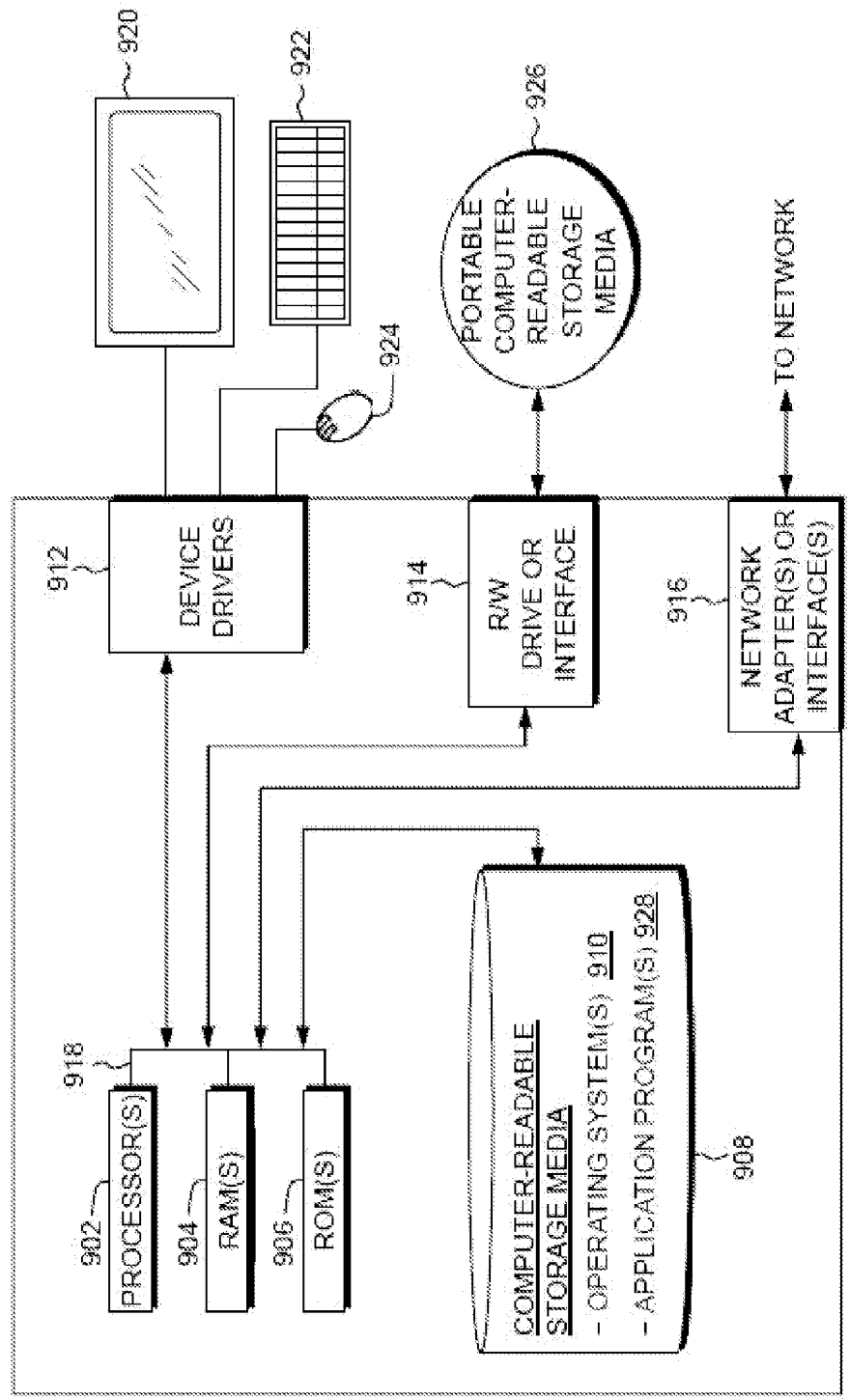
FIG. 8 is a functional block diagram of components of a client computing device and/or a server device of the collaborative document annotation system of FIG. 1, in accordance with an embodiment of the present invention.

FIG. 8 depicts a block diagram of components of a client computing device 110 and/or a server 120 of FIG. 1, in accordance with an embodiment of the present invention. It should be appreciated that FIG. 8 provides only an illustration of one implementation and does not imply any limitations with regard to the environments in which different embodiments may be implemented. Many modifications to the depicted environment may be made.

Client computing devices 110 and/or a server 120 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 928, for example, load balancer module 202, intrusion prevention systems 206A-206C, connection state manager 208 and/or topology manager 212, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Client computing devices 110 and/or a server 120 may also include a R/W drive or interface 914 to read from and write to one or more portable computer readable storage media 926. Application programs 928 on client computing devices 110 and/or a server 120 may be stored on one or more of the portable computer readable storage media 926, read via the respective R/W drive or interface 914 and loaded into the respective computer readable storage media 908.

Client computing devices 110 and/or a server 120 may also include a network adapter or interface 916, such as a TCP/IP adapter card or wireless communication adapter (such as a 4G wireless communication adapter using OFDMA technology). Application programs 928 on computing devices 110 and/or a server 120 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Client computing devices 110 and/or a server 120 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 9:
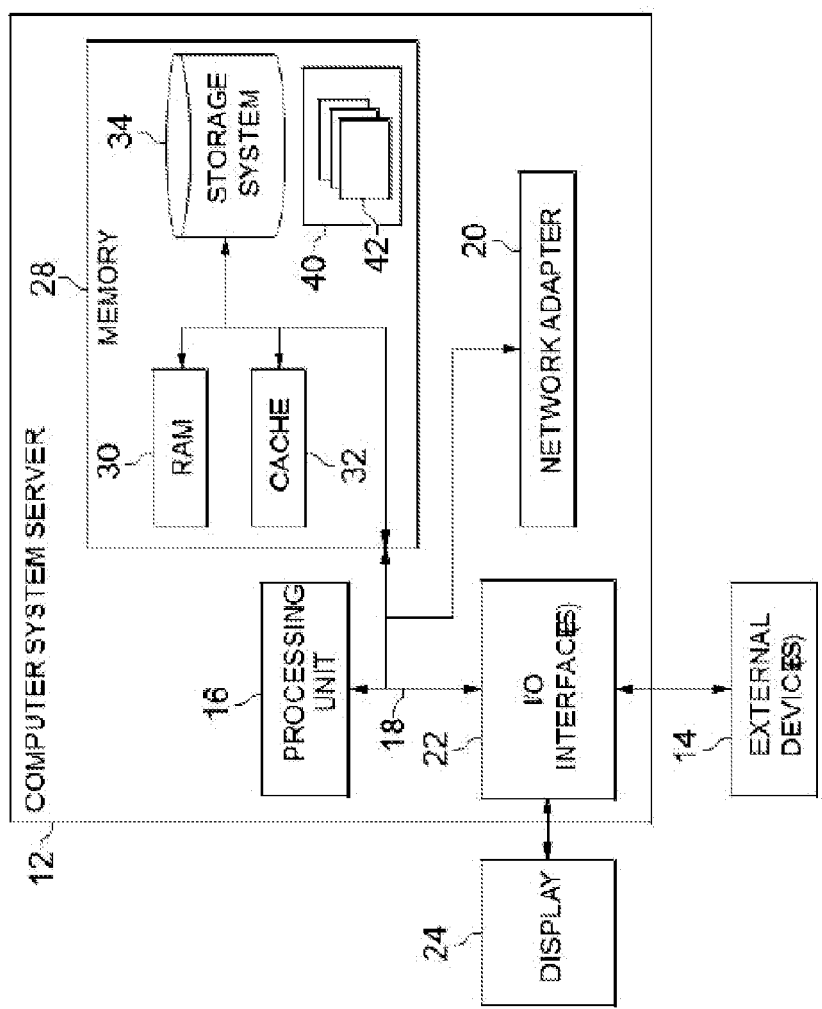
FIG. 9 depicts a cloud computing node according to an embodiment of the present invention.

Referring now to FIG. 9, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 10:
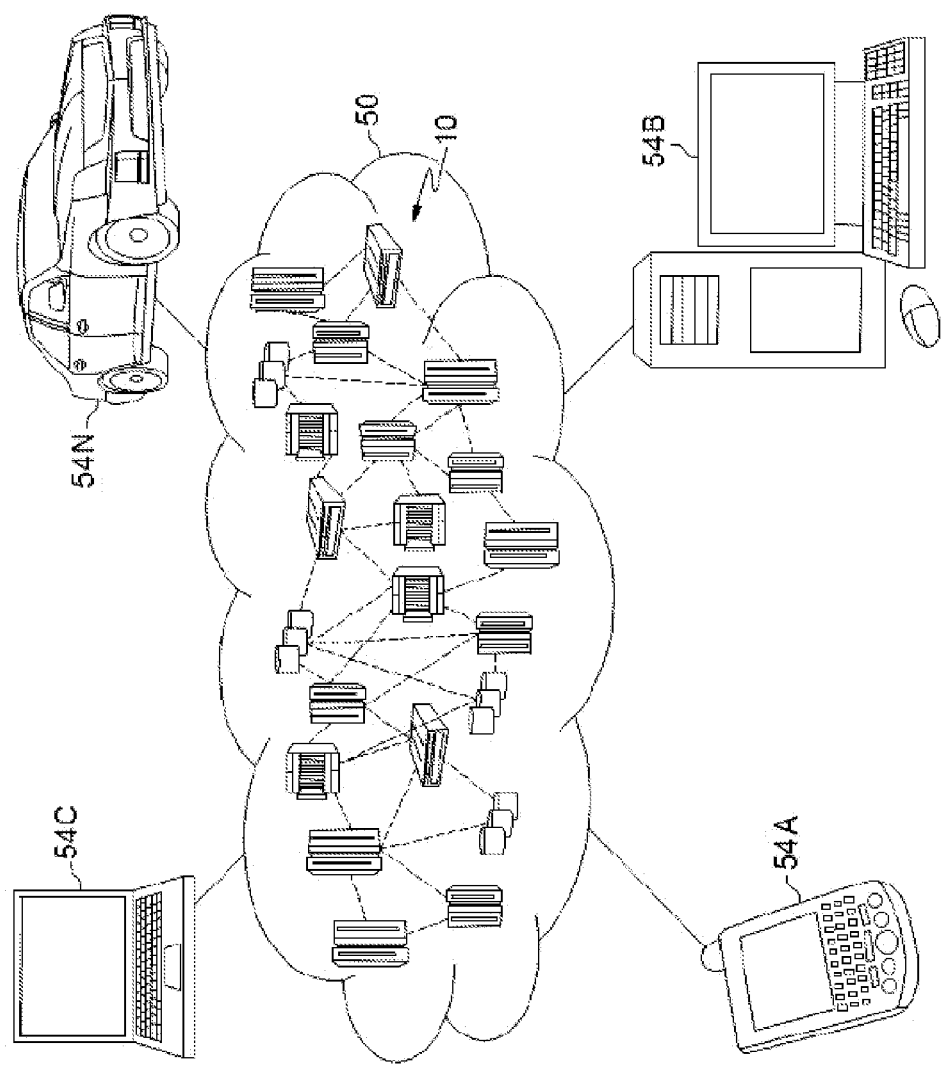
FIG. 10 depicts a cloud computing environment according to an embodiment of the present invention.

Referring now to FIG. 10, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
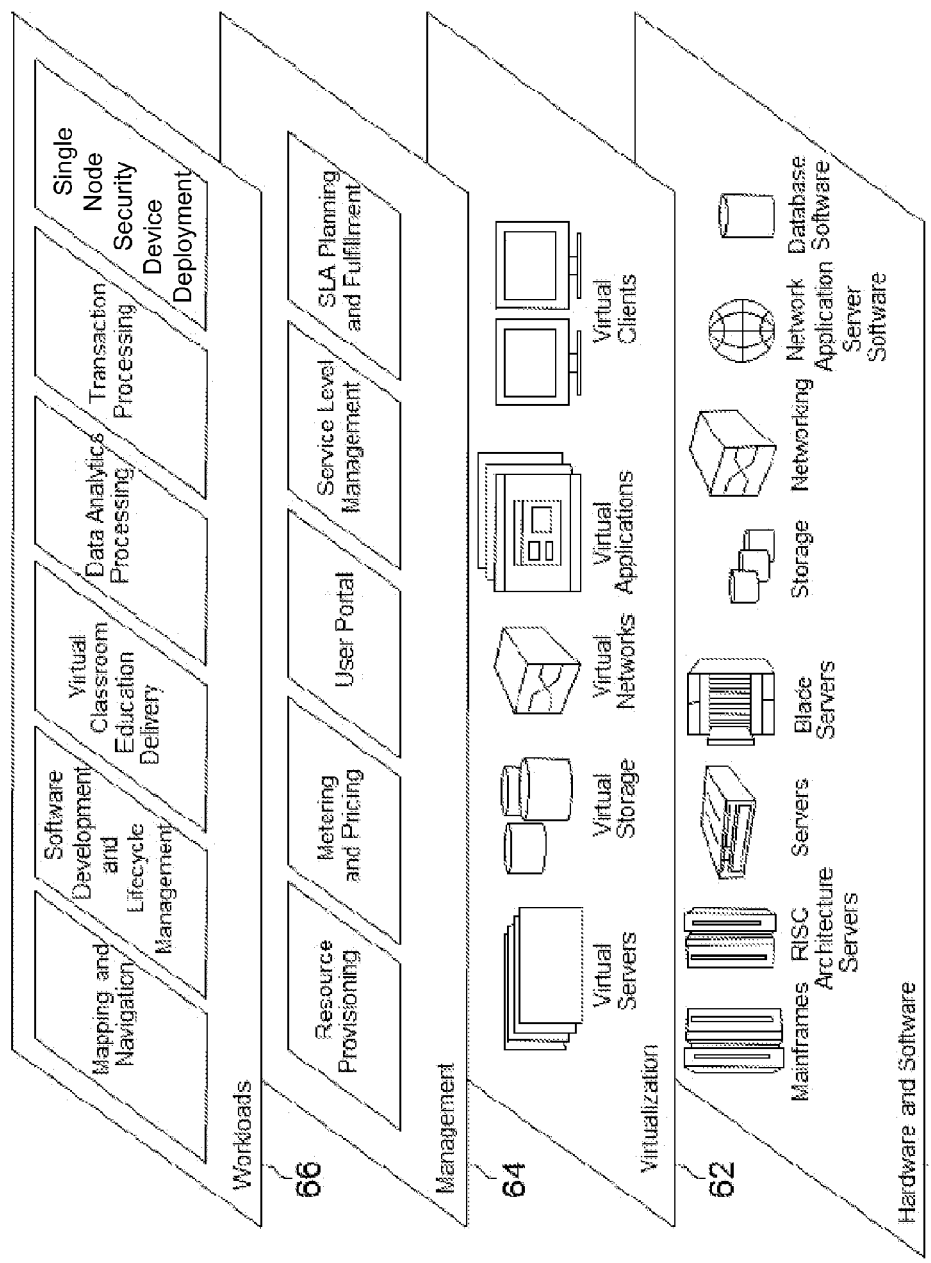
FIG. 11 depicts abstraction model layers according to an embodiment of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes; RISC (Reduced Instruction Set Computer) architecture based servers; storage devices; networks and networking components. In some embodiments, software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and single node security device deployment. Single node security device deployment relates to utilizing a single node connection state manager to deploy an intrusion prevention system in a high availability environment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed in accordance with the present invention. However, numerous modifications and substitutions can be made without deviating from the scope of the present invention. Therefore, the present invention has been disclosed by way of example and not limitation.

The foregoing description of various embodiments of the present invention has been presented for purposes of illustration and description. It is not intended to be exhaustive nor to limit the invention to the precise form disclosed. Many modifications and variations are possible. Such modification and variations that may be apparent to a person skilled in the art of the invention are intended to be included within the scope of the invention as defined by the accompanying claims.

What is claimed is:

1. A method for operating a security appliance system in a high availability environment, the security appliance system contains a plurality of intrusion prevention systems connected to a load balancer and a client computing device, each intrusion prevention system containing stored session state information in a local session state data store, the load balancer containing a shared hash algorithm, the client computing device containing a connection state manager and a topology manager, the connection state manager containing a network session state data store, the topology manager recording connectivity changes of the intrusion prevention systems and adjusting the shared hash algorithm to accommodate the changes, the method comprising:

receiving, in the load balancer, a string of data packets that include session state information and routing information wherein the string includes data packets sent from an identified source to an identified destination;

generating, in the load balancer, a hash value for the string using the shared hash algorithm and the routing information, wherein the generated hash value is a hexadecimal value;

selecting, by the load balancer, one of the plurality of intrusion prevention systems based on the generated hash value, wherein a last digit of the generated hash value corresponds to a primary intrusion prevention system within the plurality of intrusion prevention systems to which the received string of data packets will be forwarded, and wherein a penultimate digit of the generated hash value corresponds to an alternate intrusion prevention system within the plurality of intrusion prevention systems to which the received string of data packets will be forwarded;

in response to the primary intrusion prevention system being operational, forwarding the string from the load balancer to the primary intrusion prevention system based on the generated hash value;

in response to the primary intrusion prevention system not being operational, forwarding the string from the load balancer to the alternate intrusion prevention system based on the generated hash value;

in response to determining, by the primary intrusion prevention system, that the forwarded string has stored session state information within the local session state data store using the generated hash value, processing, by the primary intrusion prevention system, the forwarded string using the stored session state information;

in response to forwarding the string to the alternate intrusion prevention system:
  creating a session state lookup request based on the forwarded string;
  locating the stored session state information in the network session state data store in a connection state manager based on the created session state lookup request, wherein the connection state manager is a central management system that stores session state information for all of the plurality of intrusion prevention systems;
  processing the forwarded string using the located session state information; and
  updating the stored session state information in the local session state data store and the network session state data store using the processed string.

2. The method of claim 1 further comprising:
in response to determining, by the selected intrusion prevention system, that the forwarded string does not have stored session state information within the local session state data store and the network session state data store using the generated hash value, creating a new stored session state information in the local session state data store and the network session state data store based on the forwarded string.

3. The method of claim 1, wherein the routing information includes a source internet protocol address, a destination internet protocol address, a protocol, a source port, and a destination port.

4. The method of claim 1, wherein the network session state data store is partitioned into a plurality of connection tables based on each intrusion prevention system within the security appliance system.

5. The method of claim 1, wherein the network session state data store is located in a connection state manager.

6. The method of claim 1, wherein session state information includes flow state information and connection state information.

* * * * *